(12) United States Patent
O'Brien et al.

(10) Patent No.: US 7,571,598 B2
(45) Date of Patent: Aug. 11, 2009

(54) PLASMA TORCH FOR IGNITION, FLAMEHOLDING AND ENHANCEMENT OF COMBUSTION IN HIGH SPEED FLOWS

(75) Inventors: Walter F. O'Brien, Blacksburg, VA (US); Matthew C. Billingsley, Blacksburg, VA (US); Darius D. Sanders, Dayton, OH (US); Joseph A. Schetz, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 625 days.

(21) Appl. No.: 11/419,168

(22) Filed: May 18, 2006

(65) Prior Publication Data

US 2007/0044449 A1    Mar. 1, 2007

Related U.S. Application Data

(60) Provisional application No. 60/682,424, filed on May 19, 2005.

(51) Int. Cl.
*F02G 3/00*    (2006.01)
(52) U.S. Cl. ..................... 60/39.826; 60/761
(58) Field of Classification Search .......... 60/761, 60/39.821, 39.826, 39.83, 202, 203.1; 431/2; 123/143 B; 313/143, 118–145
See application file for complete search history.

(56) References Cited

U.S. PATENT DOCUMENTS

| | | | | |
|---|---|---|---|---|
| 3,800,530 | A | * | 4/1974 | Nash ........................... 60/761 |
| 5,640,841 | A | * | 6/1997 | Crosby ....................... 60/776 |
| 5,938,944 | A | * | 8/1999 | Baughman et al. ....... 219/76.16 |

* cited by examiner

*Primary Examiner*—Michael Cuff
*Assistant Examiner*—Vikansha S Dwivedi
(74) *Attorney, Agent, or Firm*—Whitham, Curtis, Christofferson & Cook, P.C.

(57) ABSTRACT

Preheating of fuel and injection into a plasma torch plume fro adjacent the plasma torch plume provides for only ignition with reduced delay but improved fuel-air mixing and fuel atomization as well as combustion reaction enhancement. Heat exchange also reduced erosion of the anode of the plasma torch. Fuel mixing atomization, fuel mixture distribution enhancement and combustion reaction enhancement are improved by unsteady plasma torch energization, integral formation of the heat exchanger, fuel injection nozzle and plasma torch anode in a more compact, low-profile arrangement which is not intrusive on a highspeed air flow with which the invention is particularly effective and further enhanced by use of nitrogen as a feedstock material and inclusion of high pressure gases in the fuel to cause effervescence during injection.

20 Claims, 9 Drawing Sheets

PLASMA TORCH FOR IGNITION, FLAMEHOLDING AND ENHANCEMENT OF COMBUSTION IN HIGH SPEED FLOWS

CROSS-REFERENCE TO RELATED APPLICATIONS

This application claims priority of U.S. Provisional Patent Application 60/682,424, filed May 19, 2005, which is hereby fully incorporated by reference.

STATEMENT OF GOVERNMENT INTEREST

This invention was federally funded under NASA grant NAG-1-02108. The U.S. Government has certain rights in this invention.

BACKGROUND OF THE INVENTION

1. Field of the Invention

The present invention generally relates to jet engines and other applications including combustion in an environment of high speed gas flow and, more particularly, to so-called scramjets, ramjets and jet engine afterburners.

2. Description of the Prior Art

Efficient and reliable operation of supersonic combustion ramjet (scramjet) engines and ramjet engines (which operate similarly but with sub-sonic flow regimes) and other applications needing combustion in high speed flow regimes (such as jet engine afterburners) relies on rapid and predictable mixing of fuel with ambient air, reliable ignition and flameholding and enhancement of the combustion reaction. Ignition and flameholding is particularly difficult at flow velocity regimes approaching and above the speed of sound. Depending on the fuel choice and flight speed, different ignition arrangements including cavities or ramps (which are well-known geometries for protection for an ignition source) and pyrophoric compounds have been used for ignition and flameholding. Similarly, shock waves and other flow anomalies within an engine at such flow velocity regimes have held the degree of mixing of fuel and air (and/or other combustion gases whether ambient or applied to the engine in the manner of a fuel) hereinafter referred to simply as fuel mixing to levels presumably much less than optimum. Upstream fuel injection is generally considered to be required in order to provide time for atomization and mixing of the fuel in a high speed gas flow prior to ignition but which is very limited due to restrictions on size of an engine usable in a practical aircraft. That is, at supersonic flow rates, fuel injected upstream from the igniting arrangement will reach and pass the igniting arrangement in a very short time well before mixing and atomization (which increases surface and reaction area of fuel droplets) has taken place to an optimum degree since the fuel injection and ignition locations must necessarily be less than the engine length which, in turn, must necessarily be no greater than the aircraft length. Additionally, there appears to be a trade-off with the distance of the fuel injection point in advance of the igniter which affects mixing and atomization and the likelihood of the fuel reliably reaching the igniter. Therefore optimization of the combustion reaction, especially for wide range operation, is difficult.

Moreover, all three of these requirements are currently addressed by separate mechanisms or arrangements, each of which has tended to be bulky and of significant weight, contrary to what is desirable in an aircraft engine. Thus, attempts to improve the efficiency of any of them in regard to their function generally tends to increase bulk, weight or both while yielding only marginal improvements in engine performance.

Use of an electric plasma torch for ignition and flameholding is known. However, simply using a plasma torch as an ignition source does not mitigate the problems of obtaining good fuel mixing or combustion enhancement. Further, in such a system, as with ramps, cavities and pyrophoric compounds, use of known plasma torches is not significantly controllable to regulate the performance of the combustion system. Further, difficulties and delays in achieving ignition due to insufficient atomization and mixing presents a substantial safety hazard. Additionally, approaches to improvement of ignition, atomization, mixing and combustion enhancement known in the art have required structures which intrude into the high speed air flow; causing further disturbances and shock waves that may disrupt, for example, uniformity of fuel distribution (which often tends to follow the wavefronts of shock waves).

While these and other problem are particularly significant in scramjet engines, they also appear to greater or lesser degrees in other applications for developing high temperature and stable ignition in a high velocity flow regime such as jet afterburners or ramjets (where the flow is subsonic) and treatment or refinement of bulk materials as is industrial processes depending on a flow of heated air).

SUMMARY OF THE INVENTION

It is therefore an object of the present invention to provide a simple, robust and reliable arrangement for ignition and flameholding in high velocity flow regimes which also improves fuel mixing and enhances the combustion reaction while being of reduced size and weight. It is another object of the invention to provide a structure in which ignition can be achieved with reduced delay.

In order to accomplish these and other objects of the invention, the basic invention provides a plasma torch with a fuel injector and heat exchanger which may be retrofitted to existing plasma torches or integrated in a new design; either of which provides improved fuel mixing and atomization and improved optimization of the combustion reaction as well as providing improved and controllable ignition and flame holding. Other aspects of the invention may be provided as perfecting features of the basic invention or inventive features which may be retrofitted to known plasma torch structures and which improve the performance thereof. More specifically, a combined plasma torch igniter/mixer/combustion reaction enhancer and a jet engine including the same are provided wherein the igniter/mixer/combustion reaction enhancer comprises a plasma torch including an anode an capable of producing a plasma plume, a heat exchanger for preheating fuel and cooling said anode, a nozzle for injecting preheated fuel into the plasma plume from a location adjacent the plasma plume, and an arrangement for passing feedstock material adjacent the anode.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
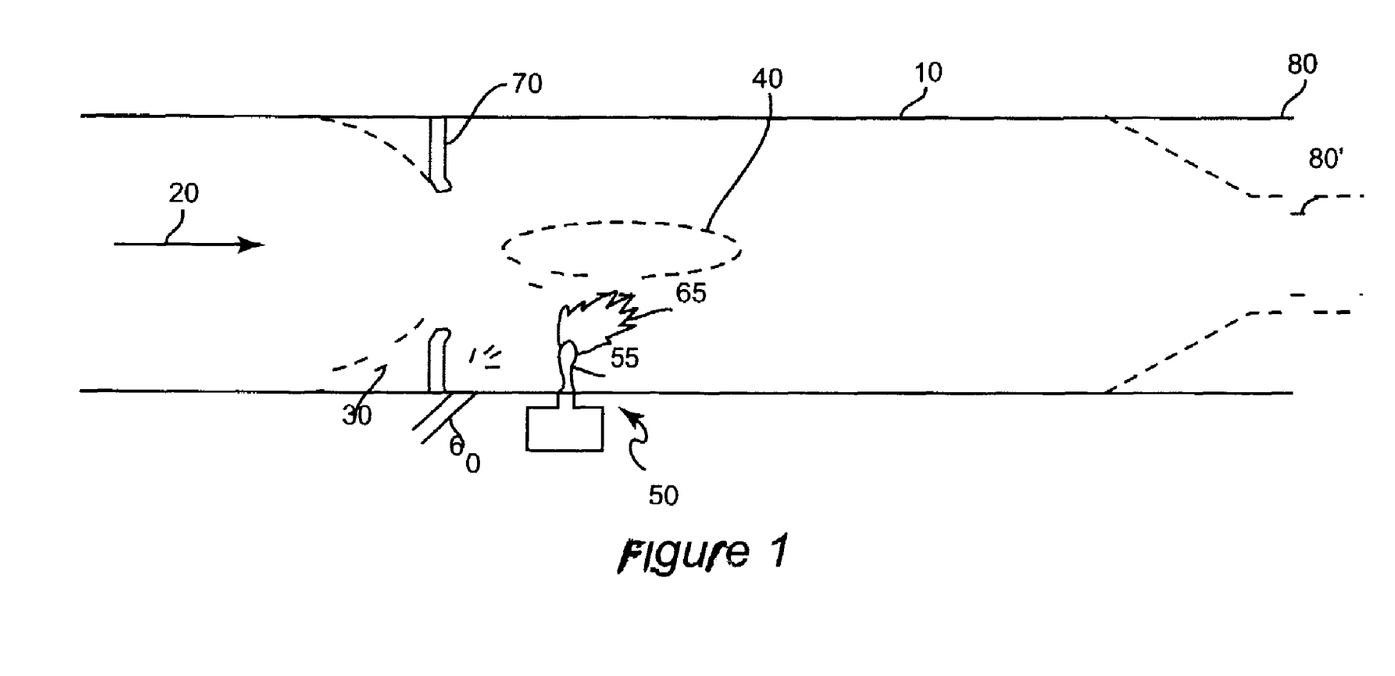
FIG. 1 is a schematic depiction of a cross-section of a duct having a high speed gas flow therein and including the basic elements of a Srcamjet or jet afterburner.

Referring now to the drawings, and more particularly to FIG. 1, there is shown a cross-sectional schematic view of a duct 10 having a high velocity gas flow 20 therein and the basic elements of a scramjet or ramjet engine or jet engine afterburner with which the invention may be employed. Duct 10 is illustrated for generality and would have a more complex internal shape for either of the above applications, as represented by schematically illustrated ramps/cavities 30. On the other hand, a straight-walled duct may, in fact, be preferred for some applications such as a large scale heat source for heat-driven process applications. The source of the high velocity gas flow is not important to the principles of the invention or its successful practice as long as the flow is such that the gas flow is compressed (e.g. by a compressor, a constriction and/or viscous drag at ramps/cavities 30 which also tend to direct expanding gases from ignition to the right, as illustrated) at a position within the duct where principal ignition is to take place. Such internal duct shaping and the resulting compression generally slows air flow 20 by a significant amount but the flow velocity remains significant and may be several times the speed of sound in scramjet engines in which the flow velocity may be reduced, for example, from the range of Mach 4-6 to about Mach 2.

A plasma torch, in some forms suitable to cause ignition, is a quite familiar device which has an anode and a cathode which are separated and have a voltage applied between them. Then, by increasing proximity or voltage (such as by superimposing a high frequency signal on the applied voltage) or a combination of the two, an arc is struck between the anode and cathode and produces ionization in the adjacent (e.g. feedstock) gases forming a very hot plasma plume of high temperature charged and neutral particles that may ignite other materials adjacent or directed into the plume. The arc may be made periodic (as in an automobile spark plug or so-called "pilot-less" ignition sources for stoves or furnaces) or continuous as is required in the case of jet engines where combustion is continuous and continuous ignition is required to maintain it. The plasma torch is also familiar in the metalworking arts (e.g. for welding or brazing) where the anode and cathode are generally arranged symmetrically such that when an arc is truck the plasma of excited charged and neutral particles form a characteristic luminescent plume 55 (generally referred to as "pressureless" since the gas in the plume may the turbulent but is not significantly accelerated) in a shape generally resembling the shape of a fish (sometimes referred to as a whale) with points of the "tail" terminating at the anode and cathode. This general shape of the plasma plume is not critical to the practice of the invention and is, in fact, altered from the plume of a plasma torch used in metalworking but awareness of the plume and its characteristic shape will be helpful in understanding the following discussion of the invention and its practice.

Returning to FIG. 1, a injector 60 for injecting a small amount of fuel is provided upstream of the plasma torch/igniter 50 as is considered necessary to accommodate the high velocity gas flow in duct 10. However, in some cases, the injector can be combined with the igniter. The distance between the fuel injector and the igniter may be more or less critical to the functions of ignition, flameholding and combustion enhancement as alluded to above since increase of the distance may marginally improve fuel mixing and atomization while increasing the difficulty of directing a sufficient amount of the injected fuel to the igniter (or assuring such direction will reliably occur). The fuel injector 60 may be recessed into the duct walls 10 (sometimes referred to as a cavity), as shown, to marginally improve flameholding and to avoid intrusion into the flow 20.

Assuming that fuel mixed with gas reaches the igniter 50, it will generally ignite if mixing and atomization is sufficient (but not necessarily optimal) causing a flame 65 which can be used to ignite fuel injected by main fuel injectors 70. When the main fuel is ignited, very high temperature and partially ionized gas is produced and is expelled from the duct 10, the mass and acceleration of the expelled gases producing thrust particularly where ramps/cavities 30 are present to assist in directing the accelerated and expanding gases at exhaust port 80 (which may also be constricted for improved gas acceleration). Exhaust port 80 may be and, for jet engines, preferably is constricted by a nozzle 80' to constrict and thus pressurize and accelerate exhaust gases to increase available thrust.

Figures 2A, 2B:
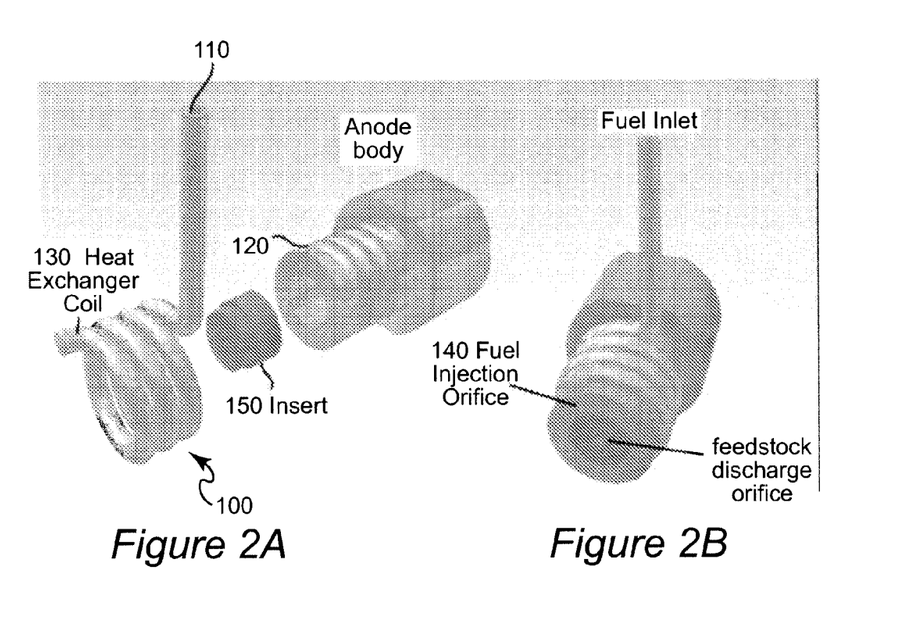
FIGS. 2A and 2B are exploded and assembled isometric views of a plasma torch anode of a known type but modified in accordance with the invention.

A first aspect of the invention will now be discussed with reference to FIGS. 2A and 2B. As alluded to above, the key to application of a plasma torch in supersonic combustion is the interaction of the torch plume with the combustible mixture. Among flow effects favoring good combustion for both liquid and gaseous fuels are atomization (in the case of liquid fuels) and rapid mixing of the fuel and air to form the desired combustible mixture. In previous reported work with plasma torches in supersonic combustion, the power supply to the torch has been steady in time, and use of the plasma torch plume as an atomizer for liquid hydrocarbon fuels has not been explored.

Further, it should be noted that under certain circumstances, hydrocarbon-based fuels provide superior cruising range performance as compared with hydrogen based fuels. However, some problems with hydrocarbon-based fuel engines have remained substantially intractable. Among these problems are the relatively long ignition delay times present with hydrocarbons and the necessity of rapid atomization, mixing and ignition. The first aspect of the invention will be described in connection with an atomizer-igniter anode provided as a modification of a well-known anode structure. The inventors have realized that preheating a liquid fuel prior to ignition would have a positive effect on combustion. Fuel preheating is a useful and practical way to reduce the fuel evaporation time. Furthermore, an increase in temperature reduces the viscosity and surface tension of the fuel, leading to better atomization (e.g. reduced initial drop sizes and therefore a further decrease in the evaporation time. Preheating also raises the reactant mixture to a higher initial mean temperature, reducing the time required for a chemical reaction to occur.

In accordance with this aspect of the invention, a heat exchanger 100 is provided by winding a fuel injection tube tightly around the anode 120 such that fuel exits the fuel supply tube adjacent the plasma torch plume. Copper is preferred for the anode body for excellent electrical conductivity, resistance to erosion using most feed stock materials and thermal conductivity. The heat exchanger is also formed of copper tube for much the same reasons. For proof of concept testing, the upstanding end of the heat exchanger coil, as illustrated in FIGS. 2A and 2B was plugged (but is still effective to capture a small but effective amount of heat from the combustion process). The coil portion 130 of the heat exchanger 100 serves to capture heat from and reduce temperature of the anode body 120 which helps to address the problem of anode erosion leading to longer anode life and greater plasma torch reliability. It should be appreciated that, in operation, both of these sources of heat serve to heat the fuel regeneratively.

Again, for proof-of-concept testing, the extended end 110 of the heat exchanger was plugged and a small hole (not visible in FIG. 2A or 2B but schematically illustrated in FIG. 6) was drilled into the inside of the heat exchanger coil and the anode body allowing a jet of fuel to be injected at an angle an to pass directly into the plasma torch plume and/or discharge of plasma torch feedstock (a material such as nitrogen or any other suitable feedstock gas) supplied to the plasma torch in order to increase the quantity and, possibly, energy of the plasma in the plasma torch plume). It is preferred to use an insert 150 for ease of replacement. Fuel is preferably injected at a pressure of about 20-70 psi to provide a suitable or desired feedstock material flow rate.

This arrangement takes advantage of the relative velocities of the already-existing high temperature feedstock gas produced by the plasma torch igniter and the supersonic stream of air 20 and forms a type of fluid blast or fluid-assist atomizing mechanism. More specifically, this design could be considered as an external-mixing fluid-assist atomizer as the high velocity feedstock gas impinges on the liquid fuel stream but is combined with a robust igniter in accordance with the invention. However, with respect to the atomizing action, it is more accurately considered as a plain orifice pressure atomizer acting in combination with an external-mixing fluid-assist atomizer yielding a type of hybrid atomizer with two separate modes of atomization. In the first mode, the pressure difference across the orifice acts to impart kinetic energy to the liquid stream. In the second mode, the kinetic energy of the atomizing gas is used to shatter the stream or droplets of fuel.

Figure 3A:
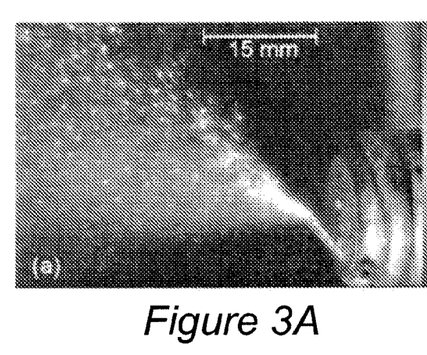
FIGS. 3A and 3B are high-speed photographs of mixing and atomization of materials in air in accordance with the invention for comparison purposes.
Figure 3B:
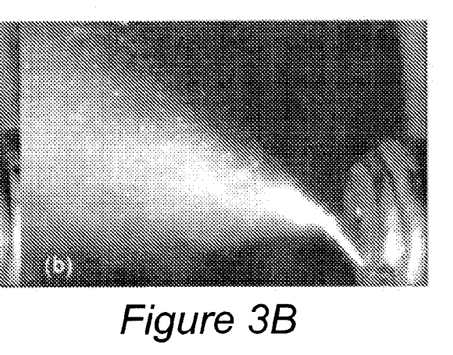

FIGS. 3A and 3B are a comparison of strobe photographs showing comparative degrees of atomization for water and kerosene for the same injection pressure and feedstock flow rate. in these photographs, the plasma torch is not ignited. It is clearly seen that the atomizer formed by the plasma torch structure into a cone-shaped polydisperse spray with the water spray exhibiting a larger number of large droplets as is principally attributed to the surface tension of water and kerosene, respectively. In FIGS. 3A and 3B, neither the water nor the kerosene was heated, but since heating reduces surface tension, the atomization shown in FIG. 3B would be even much finer with smaller droplets as can be seen in FIGS. 4A and 4B.

Figure 4A:
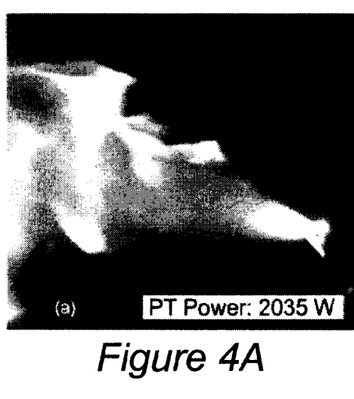
FIGS. 4A and 4B are photographs of ignition of JP-7 jet fuel and kerosene injected and ignited in accordance with the invention.
Figure 4B:
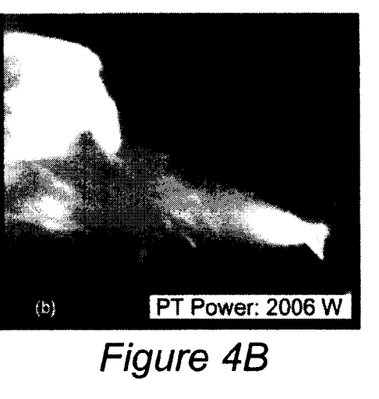

In FIGS. 4A and 4B, photographs of combustion of JP-7 jet fuel and kerosene are respectively shown. Since the plasma torch is operated/energized (as may be discerned by the characteristic fish-shaped plume of the plasma torch) in this case, the fuel is, in fact, heated and ignited. Ignition occurs to the left side of each photograph while the atomized fuel is seen as a luminous cone of extremely fine droplets as it mixes with air. Injection occurs from below the plasma torch plum and proceeds upward and to the left. Shortly after fuel injection, the sonic gas stream impinges upon the fuel jet, scattering it into a spray of very fine droplets. the region of interaction appears as the bright, bulbous portion on the right side of the images. The light scattering and reflection due to the droplets is an indicator of the region of atomization and not the operation of the torch plume alone, which would be much smaller but of the same characteristic shape as shown in FIG. 5A.

Figure 5A:
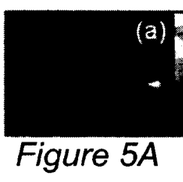
FIGS. 5A, 5B, 5C, 5D and 5E are photographs showing progression of ignition in accordance with the invention.
Figure 5B:
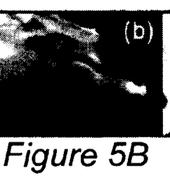
Figure 5C:
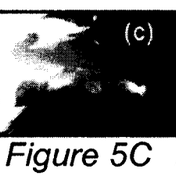
Figure 5D:
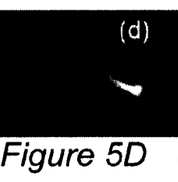
Figure 5E:
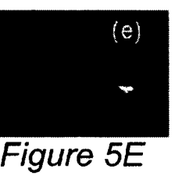

FIGS. 5A-5E are photographs showing the progression of ignition. FIG. 5A shows the torch plume alone without fuel injection. FIGS. 5B and 5C are representative of the ignition period during injection of pure fuel. FIGS. 5D and 5E show the torch/fuel plume during purging with nitrogen following the ignition period; FIG. 5E indicated of some degree of hydrocarbon combustion even after system purging with nitrogen.

Figure 6:
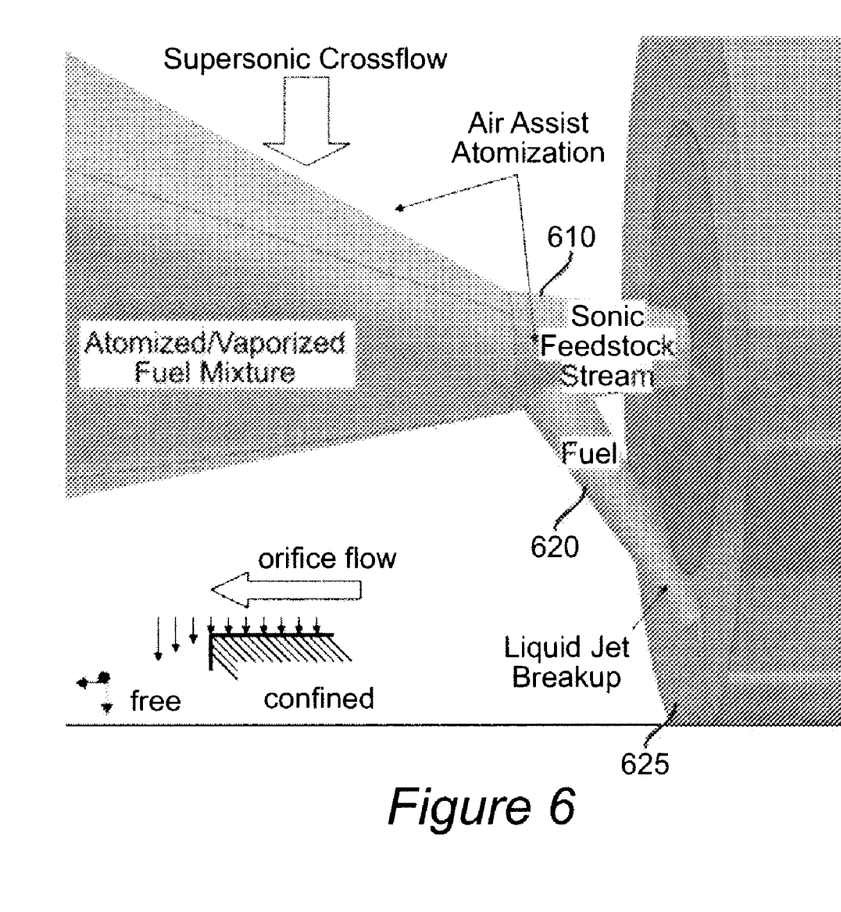
FIG. 6 is an idealized drawing of the operation of the basic invention.

To summarize the invention to this point in this description, with reference to FIG. 6, the plasma torch is operated to produce a plasma torch plume derived from the feedstock material stream. The fuel mixture is regeneratively heated by heat exchange from the plasma torch (which assists in reducing erosion of the plasma torch, particularly the anode), while a heated fuel stream 620 is injected at an angle into the plasma torch plume; the fuel temperature the liquid fuel jet breakup as it emerges from nozzle/hole 625 and the impingement of the fuel greatly on the feedstock material stream and plasma plume 610 greatly improving atomization and mixing over atomization and mixing previously obtained from upstream injection and which is not necessary in accordance with the invention. Since the distance traveled by the fuel stream before impinging of the plasma torch plume can now be very small (e.g. about one-half the diameter of the plasma torch anode), in accordance with the invention, problems and tradeoffs previously encountered with upstream fuel injection are entirely avoided. Thus, the invention allows the igniter structure to function simultaneously as an atomizer, mixer fuel preheater, and anode body cooler yielding substantially improved performance of the plasma torch and its individual constituent parts at essentially no system cost. Moreover, the delay from energization and injection of fuel to the point of ignition is greatly shortened, largely by virtue of the improved atomization and fuel mixing provided by the combination of the anode orifice, heating of the fuel and the highly energetic states of the ionized species in the ionized feedstock gas flow, increasing safety and reliability of the engine or the like since it avoids excess fuel injection and accumulation prior to ignition which can cause a substantially explosive reaction when ignition occurs.

In regard to a second aspect of the invention, it has been experimentally shown that the power applied to the injector/igniter 100 has little effect on the flame resulting from ignition. Powers as low as 850 W have been successfully used. However, it has been found that an unsteady level of energization (e.g. where the power is rapidly modulated) of the atomizer/igniter can also augment the atomization function described above. Without wishing to be held to any particular theory of operation, such an unsteady energization of the igniter (with or without the preheater/plasma torch plume atomizer described above) the oscillation of applied power appears to locate and break up internal shock positions and reduce combustion instabilities by generating additional shock waves which are projected into the ignited supersonic flow because of unsteady or oscillating combustion and acoustic waves.

Figure 7A:
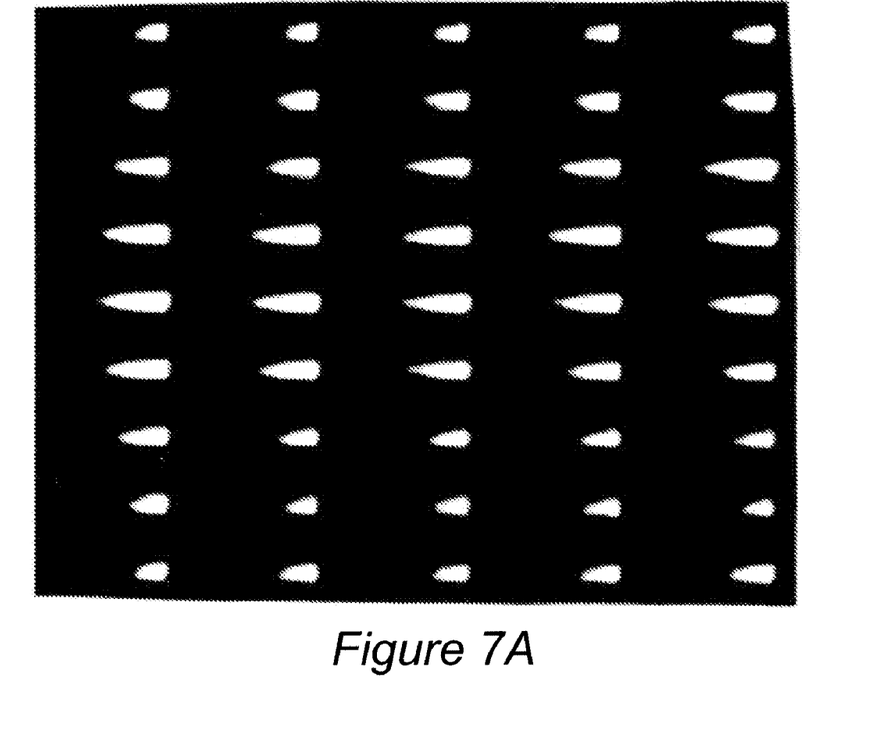
FIGS. 7A, 7B, 7C and 7D are a multiple, high-speed photograph and graphs of waveforms illustrating a second aspect of the invention including an unsteady plasma torch energization.

Such an unsteady energization (so denominated since it is the variation and approximate frequency thereof which seems to be of primary importance rather than the particulars of the variation) was, for purposes of proof-of concept experiments, provided by energizing the igniter at 260V with an oscillating current level between about 15 and 80 Amps. A short burst of high frequency was provided to initiate the electric arc as is well understood in the art. A programmable function generator was used with a current source in the form of a welder power supply which provides a wide range of voltages, frequencies and waveforms which can be used to modulate the current control of the welder. Of course, many variations of a suitable power source will be evident to those skilled in the art. The resulting variation in the plasma torch plume is shown in the photographs of FIG. 7A corresponding to five cycles of the current and voltage waveforms shown in FIGS. 7B-7D. It has been found that the unsteady energization is insensitive to frequencies below about 1.0 KHz and to waveforms and improved regularity of fuel distribution as well as atomization and mixing have been observed for sinusoidal, triangular and rectangular waveforms from 2 Hz to 4100 Hz and the torch oscillation causing movement of the shock system has been experimentally documented.

Figure 7B:
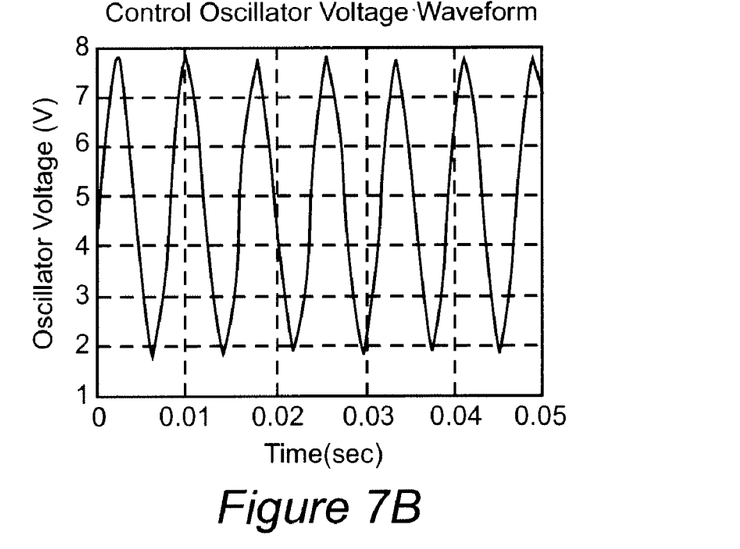
Figure 7C:
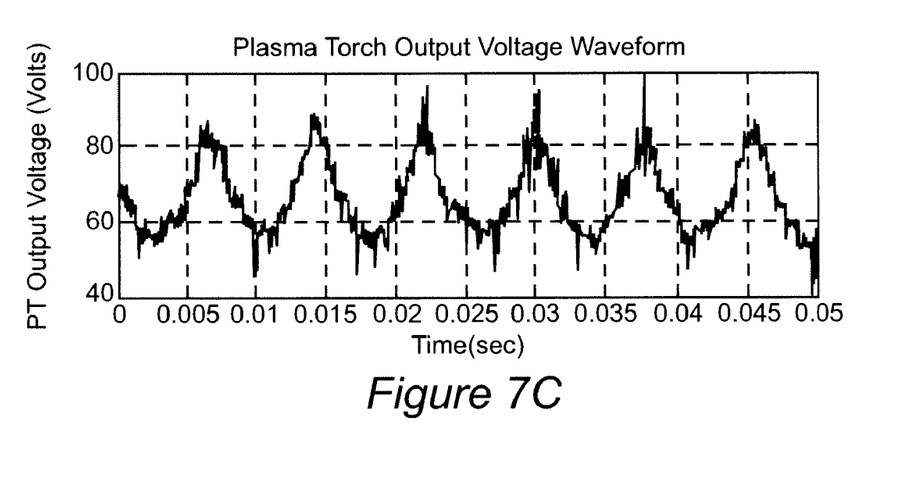
Figure 7D:
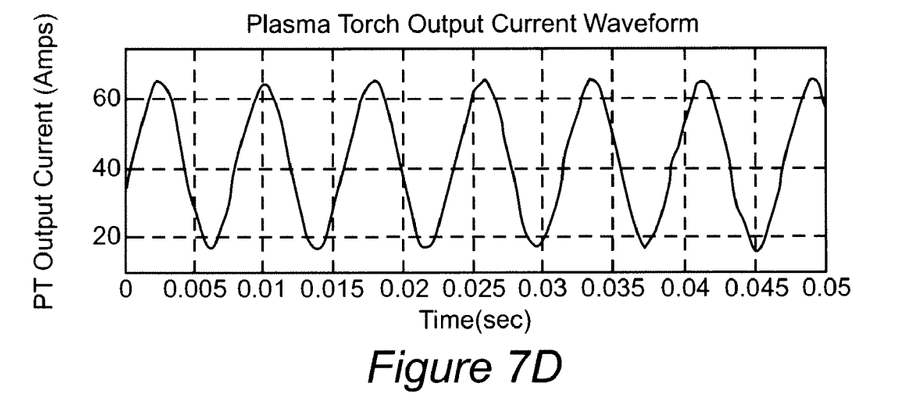
Figure 7E:
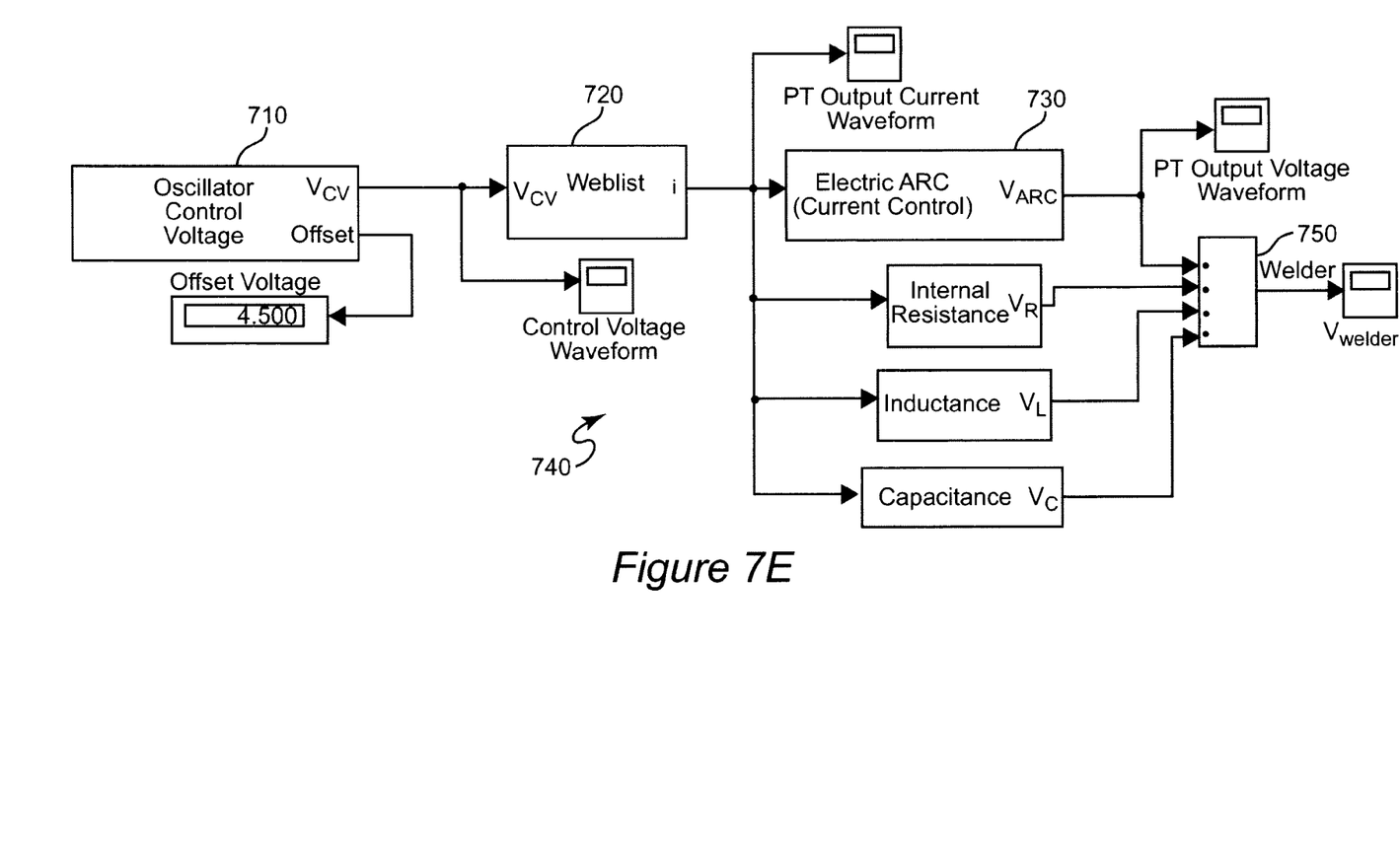
FIG. 7E is a schematic diagram of a system for producing unsteady plasma torch energization.

An exemplary system for developing unsteady energization is illustrated in FIG. 7E. An oscillatory control 710 provides a voltage of a desired waveform which oscillates at a variable frequency and is provided to control welder power supply 720. The output of the welder power supply thus controls the current of the electric arc 730 which will exhibit its own characteristic resistance, inductance and capacitance which will vary with the condition of the arc, as illustrated at 740. These electrical parameters may be directly or indirectly measured as illustrated at 750. The points at which the waveforms of FIGS. 7B-7D are also indicated in FIG. 7E.

Thus, it is seen that the provision of an unsteady energization, which, to the knowledge of the inventors, has not been previously studied, can provide an unexpected improvement in virtually all functions of an igniter, whether in accordance with the invention as described above or the prior art. Since shock waves which would adversely affect the distribution of the fuel mixture are broken up but the unsteady energization and wavefronts deriving therefrom while the variable motion of the energetic particles in the plasma torch plume augmented by the feedstock gas also tends to cause a mixing and further atomization action and evaporation in the fuel mixture.

Figure 8A:
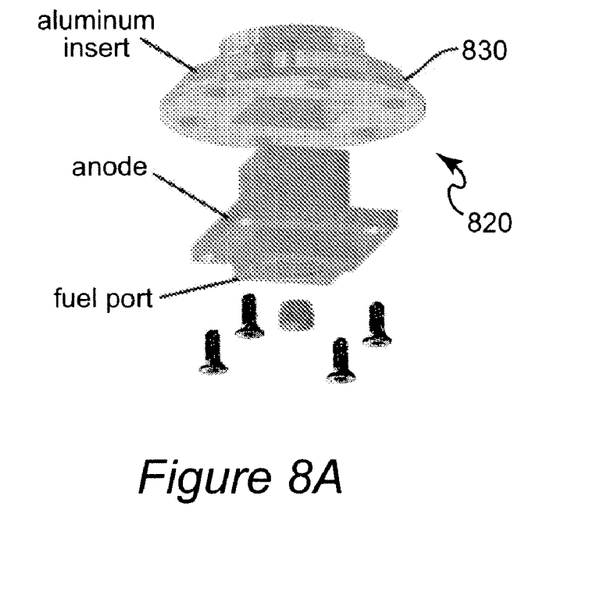
FIGS. 8A and 8B are exploded and cross-sectional views of a preferred igniter/mixer/combustion reaction enhancer in accordance with the invention.
Figure 8B:
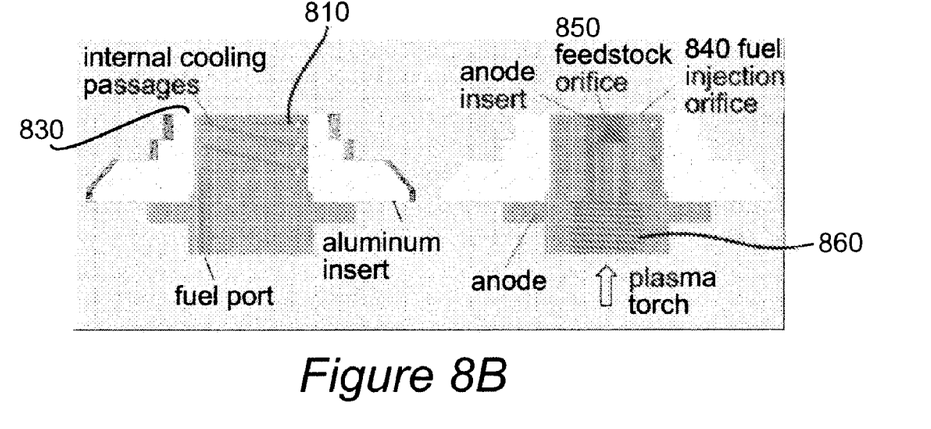

In accordance with a third aspect of the invention, the efficacy of a heat exchanger retrofit onto a known igniter anode as discussed above to achieved improved fuel atomization and mixing can be improved by a design of the igniter as illustrated in FIGS. 8A and 8B. In this design the heat exchanger is formed integrally with the plasma torch and derives increased efficiency of operation by reducing the thermal resistance from the anode to the heat exchanger and from the reaction to the heat exchanger. Therefore, this design will perform regenerative heating as well as anode cooling more efficiently and is more easily manufactured.

More specifically, in the sectional views of FIG. 8B, the fuel port 810 and the internal cooling (e.g. heat exchange passages are formed as grooves 810 on the exterior of the anode body and completed by the interior surface of the aluminum insert 830 fitted thereover. The fuel injection orifice 840 can be drilled in the anode body 820 to intersect with any portion of an annular termination of groove 810. The cathode and feedstock connections may be simply attached to the anode body by a threaded coupling 860 or the like. Thus, the anode/injector portion of the plasma torch can be fabricated f only two easily machined parts, while lending itself to having a low profile and non-intrusive shape of low volume and weight.

A fourth aspect of the invention involves an unexpected discovery by the inventors. It was noted that numerous feedstock materials can be used with the plasma torch in accordance with the invention as described above. It is much preferred that some feedstock material be used and in addition to the gases mentioned above, (e.g. hydrogen and nitrogen) hydrocarbon materials and the like can also be used. As alluded to above, nitrogen gas was often used as a matter of safety as a feedstock since normal molecular nitrogen is very stable and substantially inert and thus can prevent unwanted ignition or explosions. However, it has been found by the inventors that using nitrogen as a feedstock gas provides excellent performance in achieving and maintaining ignition and, in fact, causes rapid and reliable spontaneous ignition when impinged on properly atomized and mixed fuel mixtures. The same general effects have been observed while using air for the feedstock material since air is a good source of nitrogen and oxygen. However, it has also been found that the oxygen content of air greatly increases anode erosion. Nevertheless, use of air may be desired for initial ignition where more heat would be useful or for particularly high altitude applications where the nitrogen content of air is relatively increased while oxygen content is much reduced. Therefore, an embodiment of the invention using air for a feedstock gas may provide advantages in ceratin operational circumstances.

Figure 9:
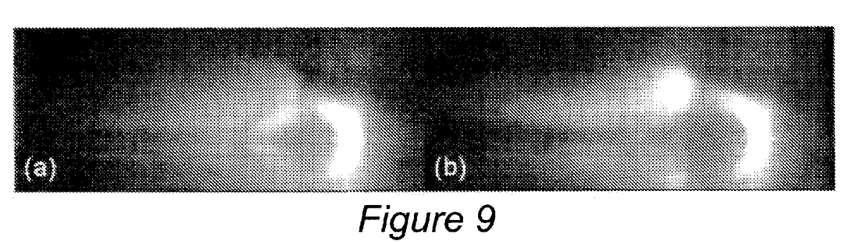
FIGS. 9A and 9B are comparative photographs showing effects of fuel effervescence in accordance with the invention.
Figure 10:
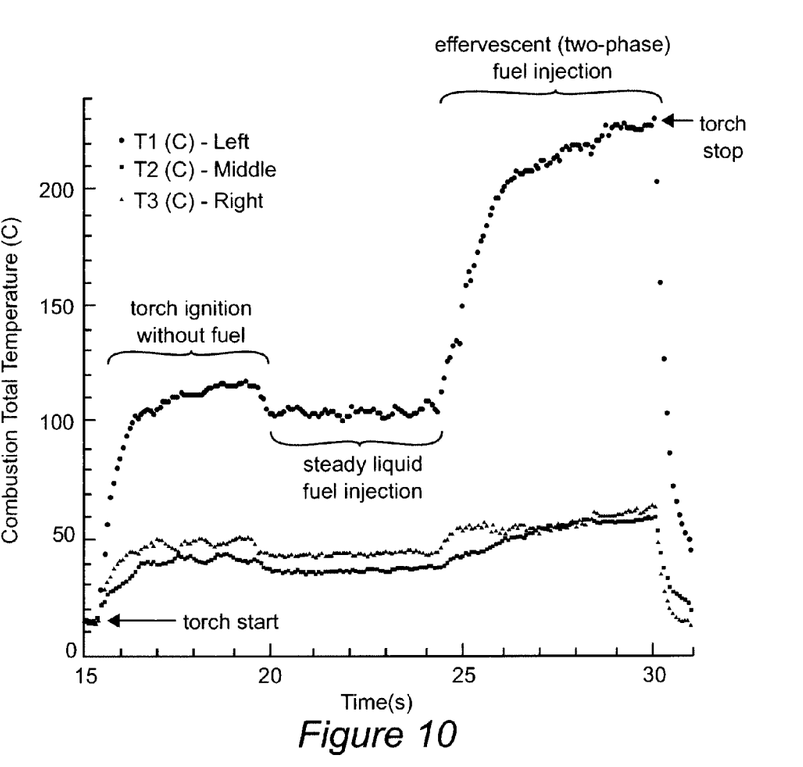
FIG. 10 is a graphical depiction of additional heat developed from fuel effervescence.

In accordance with a fifth aspect with the invention which may be used alone or in combination with and of the perfecting features described above in connection with the second through fourth aspect of the invention, the inventors have found that yet further improvements in atomization and mixing and thus enhancement of combustion can be achieved by introducing a high pressure gas into the fluid stream such that the gas expands vigorously spontaneously within the fuel when released (e.g. through a nozzle). Flames produced by fuels with and without such high pressure gases are shown in FIG. 9 where it can be readily seen that the flame produced where gas is introduced into the fuel is more vigorous, larger and of higher temperature (particularly as shown in FIG. 10; all of which tend to enhance combustion. It is believed that such gases, when released, will thus effectively effervesce and provide an early start to the atomization and mixing process. Virtually any gas will produce this effect to a greater or lesser degree but nitrogen is currently preferred.

In view of the foregoing, it is seen that the combination of a fuel injector with a plasma torch igniter such that fuel is injected into the plasma torch plume after regenerative heat exchange with the fuel, improves the useful lifetime of the plasma torch anode which providing improved fuel atomization and air-fuel mixing and distribution. the aspect/perfecting feature of unsteady energization of the plasma torch breaks up the shock system existing near the igniter/injector and improves fuel distribution while further enhancing atomization and fuel mixing. The heat exchanger of the plasma torch igniter/injector may be made more mechanically robust and improved in efficiency and function by integral formation of the heat exchanger and injector with the plasma torch in a novel design. The use of nitrogen as a feedstock material in combination with the improved fuel mixing, heating and atomization provides spontaneous and improved ignition in the plasma torch plume and the combustion reaction may be yet further enhanced by providing gases in the liquid fuel to develop effervescence when the fuel is injected. These perfecting features may be used singly or in any combination with the igniter/mixer/combustion reaction enhancer of the invention or with known plasma torch igniters.

While the invention has been described in terms of a single preferred embodiment and perfecting features thereof, those skilled in the art will recognize that the invention can be practiced with modification within the spirit and scope of the appended claims. In particular, additional liquid fuel streams can be added which will be ignited by contact with the original atomized and ignited fuel combustion.

Having thus described my invention, what we claim as new and desire to secure by Letters Patent is as follows:

1. A combined plasma torch igniter/mixer/combustion reaction enhancer apparatus comprising
    a plasma torch including an anode and capable of producing a plasma plume,
    a heat exchanger for preheating fuel and cooling said anode,
    a nozzle for injecting preheated fuel into said plasma plume from a location adjacent said plasma plume, and
    means for passing feedstock materials adjacent said anode.

2. An apparatus as recited in claim 1, further including means for varying energization of said plasma torch.

3. An apparatus as recited in claim 2, wherein said nozzle functions as an orifice pressure atomizer in combination with an external mixing fluid-assist atomizer.

4. An apparatus as recited in claim 1, wherein said nozzle functions as an orifice pressure atomizer in combination with an external mixing fluid-assist atomizer.

5. An apparatus as recited in claim 1 wherein said nozzle and said anode are integrally formed.

6. An apparatus as recited in claim 2 wherein said nozzle and said anode are integrally formed.

7. An apparatus as recited in claim 3 wherein said nozzle and said anode are integrally formed.

8. An apparatus as recited in claim 1 wherein said feedstock gas is nitrogen.

9. An apparatus as recited in claim 1 further including means for introducing high-pressure gas into said fuel.

10. A apparatus as recited in claim 9 wherein said high pressure gas is nitrogen.

11. A jet engine including a combined plasma torch igniter/mixer/combustion reaction enhancer apparatus comprising
    a plasma torch including an anode and capable of producing a plasma plume,
    a heat exchanger for preheating fuel and cooling said anode,
    a nozzle for injecting preheated fuel into said plasma plume from a location adjacent said plasma plume, and
    means for passing feedstock materials adjacent said anode.

12. A jet engine as recited in claim 11, further including means for varying energization of said plasma torch.

13. A jet engine as recited in claim 12, wherein said nozzle functions as an orifice pressure atomizer in combination with an external mixing fluid-assist atomizer.

14. A jet engine as recited in claim 11, wherein said nozzle functions as an orifice pressure atomizer in combination with an external mixing fluid-assist atomizer.

15. A jet engine as recited in claim 11 wherein said nozzle and said anode are integrally formed.

16. A jet engine as recited in claim 12 wherein said nozzle and said anode are integrally formed.

17. A jet engine as recited in claim 13 wherein said nozzle and said anode are integrally formed.

18. A jet engine as recited in claim 11 wherein said feedstock gas is nitrogen.

19. A jet engine as recited in claim 11 further including means for introducing high-pressure gas into said fuel.

20. A jet engine as recited in claim 19 wherein said high pressure gas is nitrogen.

* * * * *